United States Patent [19]

Sword

[11] 4,039,011
[45] Aug. 2, 1977

[54] CHIPPER SAW

[75] Inventor: Irvin E. Sword, Arlington, Wash.

[73] Assignee: Northwest Hardwoods, Inc., Portland, Oreg.

[21] Appl. No.: 670,639

[22] Filed: Mar. 26, 1976

[51] Int. Cl.² ............... B23D 57/00; B27G 13/00
[52] U.S. Cl. ........................... 144/218; 29/103 R; 83/835
[58] Field of Search ........... 29/103 R; 144/218, 223, 144/226, 227, 326 A, 326 B, 326 C, 323, 321; 83/835, 836, 837, 838, 839, 840, 846, 847, 848, 849, 850, 851, 852, 853, 854, 855, 676

[56] References Cited

U.S. PATENT DOCUMENTS

| 149,748 | 4/1874 | Hale | 83/835 |
|---|---|---|---|
| 1,811,079 | 6/1931 | Forsyth | 83/855 |
| 2,476,749 | 7/1949 | Marsh | 29/103 R |
| 2,657,720 | 11/1953 | Wolfe | 83/854 |
| 2,835,286 | 5/1958 | Weaver | 83/852 |
| 3,228,438 | 1/1966 | Serry | 83/853 |
| 3,590,472 | 7/1971 | Nix | 29/103 R |

FOREIGN PATENT DOCUMENTS

| 641,109 | 5/1962 | Canada | 83/838 |
|---|---|---|---|

*Primary Examiner*—Othell M. Simpson
*Assistant Examiner*—W. D. Bray
*Attorney, Agent, or Firm*—Kolisch, Hartwell, Dickinson & Stuart

[57] ABSTRACT

A circular saw adapted to produce chip-size material when cutting wood. The saw comprises a saw blade with teeth distributed about the circumference of the blade. The teeth are separated from each other in such a manner that in cutting a kerf, wood material is chiseled away in relatively large chip size, and such material is permitted to fall away from the kerf with minimal tendency of crushing or fracturing which would reduce the chip size.

6 Claims, 4 Drawing Figures

CHIPPER SAW

The present invention relates to saws, and more particularly to a circular saw having a novel construction which enables the saw to cut, when making a kerf in lumber or wood, relatively large, chip-size material, rather than the finely chopped up sawdust which normally is produced by a saw. The chip material produced may be converted, for instance, into paper, and under normal economic times has greater value and more varied uses than sawdust. As a consequence, use of the saw tends to minimize waste and maximize profits for an operator.

In the usual circular saw, the region between adjacent saw teeth is referred to as a gullet. Generally, circular saws have a large number of teeth, and the gullet is small and presents a narrow space between teeth. Thus, when the teeth pass through lumber fed into the saw, wood loosened by the teeth in the making of a kerf lodges in the gullets, with such tending to become jammed or crushed therein. Further, the cutting action of the teeth is such that relatively fine-sized material is cut from the wood, rather than relatively large pieces. In modern saw equipment, circular saws are usually run at relatively high speeds, and this has further tended to promote the production of finely sized, sawdust material.

As contemplated by this invention, a circular saw is provided which is devoid of the usual gullets found in conventional saws separating one tooth from another. A saw constructed according to the invention has substantially less teeth than the usual saw with the angular spacing between adjacent teeth ordinarily being 40° or more. Furthermore, the edge of the saw, extending between a tooth and the next tooth which precedes it, extends in a curved reach which initially curves at a negative angle inwardly toward the center of the saw, the thence joins smoothly with a substantially lineal expanse which expanse extends to substantially where the preceding tooth is defined. Describing the saw, progressing from one tooth to the tooth that follows it on the saw, the edge of the blade curves convexly in defining the first tooth and thence joins smoothly with this lineal reach described, the spacing of the various teeth being such that this lineal reach, when extended as an imaginary line rearwardly on the saw, subtends the following tooth and meets with the edge of the saw blade where such extends rearwardly from the following tooth toward the tooth next following.

It is further contemplated according to a preferred embodiment of the invention that the saw be provided with cutting tips or bits on the teeth thereof, such tips being set at a negative angle on the teeth and serving, in effect, to chisel wood material from the lumber being cut in the production of a kerf.

When using the saw under normal conditions, only one tooth at a time passes through the lumber being cut. On a tooth chiseling wood material from the lumber, such wood material is provided with a relatively wide, smoothly contoured void space where such may collect. And, by reason of the fact that when one tooth is making a cut there is no tooth preceding it passing through the kerf which in a maner of speaking would block passage of material away from the kerf, cut material is permitted to fall away with minimal fracturing and breaking.

The saw contemplated may be operated at conventional speeds and still produce chip material of considerable size. In addition to the advantage of the type of material cut, use of the saw results in several other advantages. For instance, it has been noted that the power requirements to use the saw generally is substantially less than normal power requirements. Furthermore, maintenance of the saw, including tooth sharpening, is simplified, producing resultant economies.

A general object of the invention, therefore, is to provide an improved circular saw which makes possible the production of relatively large, chip-size material when the saw is operated to cut a kerf.

Another object is to provide a circular saw which can be run at speeds characterizing modern saw equipment, with the production of relatively large, chip-size material, instead of conventional sawdust.

Yet another object is to provide a circular saw which, in operation, tends to chisel material from the lumber being cut, and which is constructed in such a manner that there is minimal tendency to fracture or break such material as such is cut away from the wood.

Yet a further object of the invention is to provide a novel method of cutting lumber with the production of chip-size materials as the debris that is cut away in making the kerf.

These and other objects and advantages are attained by the invention, which is described hereinbelow in conjunction with the accompanying drawings wherein.

Figure 1:
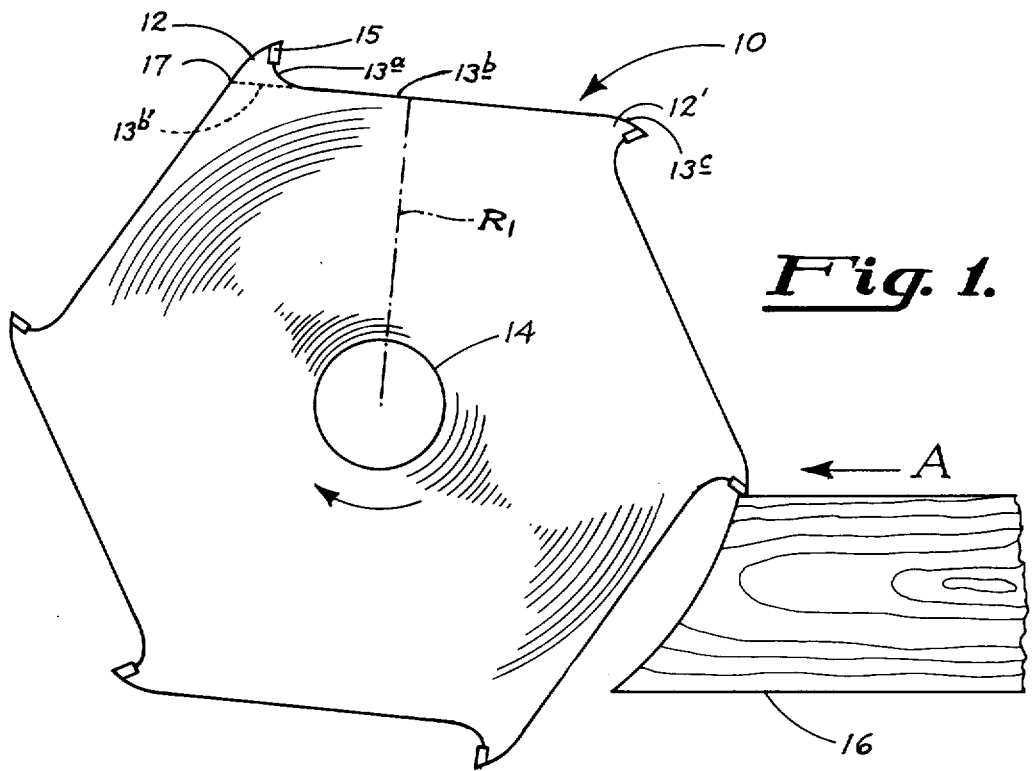
FIG. 1 is a view illustrating a circular saw constructed according to an embodiment of the invention, and illustrating, in a simplified manner, how such operates to chisel away wood during the production of a kerf.

Turning now to the drawings, and referring initially to FIG. 1, a circular saw as contemplated herein is shown generally at 10. Such comprises a saw blade having a central eye or opening 14 adapted to receive the usual arbor which mounts the saw. Distributed about the circumference of the saw blade, in a substantially circular zone extending about the perimeter of the blade, are cutting teeth 12.

The saw illustrated in FIG. 1 has six cutting teeth, so the teeth are angularly spaced one from another at 60°. In the usual instance, a saw constructed as contemplated by the invention will have no more than about nine teeth, or an angular spacing between successive teeth of 40°. Because of this spacing, and considering normal operation of the saw, as probably is most clearly illustrated in FIG. 1, during the cutting of a kerf in lumber (as exemplified by lumber 16), no more than one tooth is moving through the wood at any time. Put in another, with rotation of the saw when such is cutting lumber, successive teeth in the saw move through the lumber, with one tooth moving into and across and then beyond the side-to-side dimension of the lumber before the next following tooth on the saw partakes of such movement.

It will be further noted, and with reference to FIG. 1, that each of the teeth in the saw is provided with a cutting portion, in the particular embodiment of the invention shown a carbide tip or bit 15. Each tip is sharpened along the outer edge thereof and along opposite side edges. The plane occupied by a tip occupies what is referred to herein as a negative angle, which is to say that with respect to a radius on the saw which passes through the outermost extremity of the tip, an acute angle is defined by the plane of the tip and such radius, which acute angle faces inwardly on the saw and is on the trailing side of such radius.

With further reference to FIG. 1, the edge of the saw blade, extending from the cutting portion of a tooth (and reference is made to tooth 12) to the next tooth preceding it on the saw (which in FIG. 1 is tooth 12'), extends in a curved reach 13a which initially curves at a negative angle inwardly toward the center of the saw. The curvature thence joins smoothly with a substantially lineal expanse or reach shown at 13b, and progressing from this lineal reach joins smoothly with a convexly curved reach 13c which curves convexly over a smaller radius than the radius of the saw to form the back of the next preceding tooth. It will further be noted that lineal reach 13c intersects and is normal to a radius R1 in the saw at a location which is in advance of tooth 12 but which is closer to tooth 12 than to tooth 12' which precedes it. In this way, a void region of substantial size is provided in front of tooth 12, and behind the preceding tooth, which is bounded by smoothly contoured portions of the saw blade, and which is adapted to receive material cut off by the tooth enabling such material free passage from the cutting zone and without tending to induce fracture or breaking of such material.

It should also be noted, and with reference to FIG. 1, that the edge of the saw blade (and considering such as extending from the tip of the cutting portion of a tooth to the next tooth that follows it, i.e., considering the edge as it extends rearwardly from tooth 12' in FIG. 1) initially curves convexly about a radius which is less than the radius of the saw and thence joins smoothly with a substantially lineal reach 13c. This lineal reach joins with a concavely curved expanse (expanse 13a) which meets with a cutting portion of the following tooth. The lineal reach, when extended as an imaginary line as indicated at 13b' rearwardly on the saw, subtends the following tooth, and meets at 17 with the edge of the saw where such extends rearwardly of the following tooth toward the next following tooth. This relationship is another characteristic of providing the contour indicated between successive widely spaced teeth in the saw which is not found in conventional saw construction.

Figure 3:
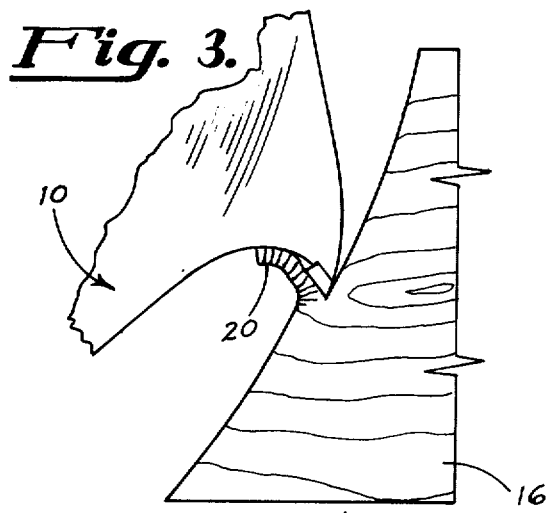
FIG. 3 is an enlarged view, similar to FIG. 2, and showing the chiseling action that is produced with the saw.
Figure 2:
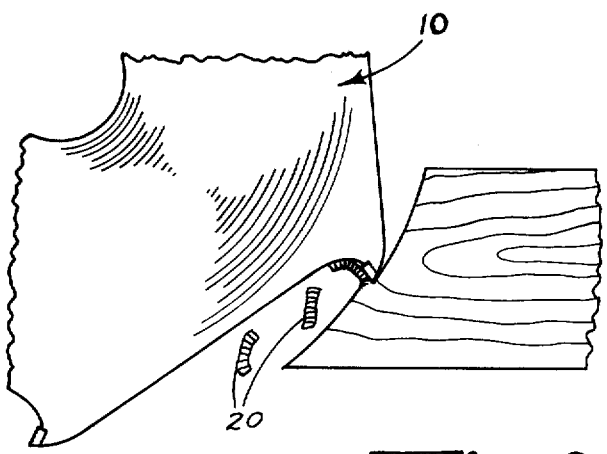
FIG. 2 is a view illustrating part of the saw shown in FIG. 1, with a tooth in the saw having advanced further through the wood.

Referring to FIGS. 2 and 3, when saw 10 is utilized to cut a kerf in wood, when such is rotated in a clockwise direction in the figures, tooth 12 chisels out chips 20 from the wood of the lumber. These chips tend to curl around curved expanse 13a onto lineal expanse 13b, and on separating fully tend to fall unimpeded into the void which is presented in front of each tooth and thence out of the kerf. With the top arbor saw which is shown in the figures, these chips move downwardly and without striking a preceding tooth to fall to the underside of the lumber, whence they may be collected in a convenient manner.

Figure 4:
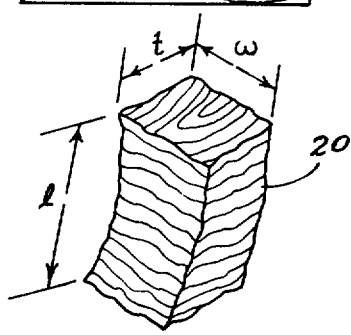
FIG. 4 is an enlarged, perspective view, illustrating a type of chip such as is cut with the saw.

Describing the operation of a typical embodiment of the saw, a 30 inch diameter saw was prepared having a gauge of 0.120 inch and six teeth equally distributed about the periphery thereof, i.e., the tooth spacing was 60°. Tips or bits on the saw had a side-to-side dimension of 0.190 inch. The saw was mounted on an arbor run at 1350 rpm and 4 inch wide lumber cut with a rip cut made along the length of the lumber, using a feed speed for the lumber of 120 feet per minute. Operation of the saw as described produced chips having a side-to-side dimension corresponding to the side-to-side dimension of the bits or tips of 0.190 inch, i.e., approximately 3/16 inch (the dimension w indicated in FIG. 4). The fiber length dimension of the chip, i.e., the dimension indicated at t in FIG. 4, was about 0.18 inch. The length dimension corresponding to the dimension l in FIG. 4, in the preponderance of the chips produced exceeded the thickness the width dimensions, and with most chips was within the range of ⅜ to ⅝ inch. The residue produced by the saw when screened was found to be 70% chip material.

Various feed speeds can be used for the lumber, ranging typically from 85 to 150 feet per minute. Arbor speeds are also variable, of course, with the arbor speed indicated typifying modern saw operation.

While the invention has been particularly shown and described with reference to the foregoing preferred embodiment, it will be understood by those skilled in the art that changes in form and detail may be made therein without departing from the spirit and scope of the invention as defined in the appended claims.

What is claimed and desired to secure by Letters Patent is:

1. A circular saw adapted to produce chip material when cutting wood comprising, a saw blade, teeth distributed about the circumference of the blade in a substantially circular zone extending about the perimeter of the blade, said teeth having at least about a 40° spacing from each other about the perimeter of the saw and each tooth including a cutting portion, the edge of the saw blade, extending from the cutting portion of a tooth to the next tooth preceding it, extending in a curved reach which initially curves at a negative angle inwardly toward the center of the saw and then curves to join smoothly and without convexity with a substantially lineal expanse which is normal to and intersects a radius in the saw, the location of said intersection being closer to said one tooth than said next preceding tooth and being in advance of said cutting portion, said edge thence continuing from said lineal reach smoothly to join without concavity with another curved reach which curves convexly and over a smaller radius than the radius of the saw to form the back of the next preceding tooth.

2. The circular saw of claim 1, wherein said cutting portion comprises a tip secured to the blade of the saw of chisel configuration, the plane occupied by said tip extending substantially in the direction of the initial curvature of said curved reach.

3. A circular saw adapted to produce chip material when cutting wood comprising, a saw blade, teeth distributed about the circumference of the blade in a substantially circular zone extending about the perimeter of the blade, said teeth having at least a 40° spacing from each other about the perimeter of the saw and each tooth including a cutting portion, said saw blade between one tooth and the next tooth preceding it being bounded by an edge that includes a first expanse which initially extends inwardly on the saw at a negative angle and thence extends to a location in advance of the one tooth where the edge intersects and is normal to a radius of the saw, said edge throughout said first expanse being devoid of convexity, said edge including a second expanse forming a smooth continuation of said first expanse which is devoid of concavity and which curves convexly to form the back of said next preceding tooth which curvature where it forms said back being of smaller radius than the radius of the saw.

4. A circular saw adapted to produce chip material when cutting wood comprising a saw blade, teeth distributed about the circumference of the blade in a substantially circular zone extending about the perimeter of the blade, each tooth including a cutting portion occupying a negative angle on the saw, the edge of the saw blade, extending from the tip of the cutting portion of a tooth to the next tooth that follows it, initially curving convexly about a radius which is less than the radius of the saw and thence joining smoothly with a substantially lineal reach, said lineal reach joining smoothly and without convexity with a concavely curved expanse meeting with the cutting portion of the following tooth, said lineal reach when extended as an imaginary line rearwardly on the saw subtending the following tooth and meeting with the edge of the saw blade where such edge extends rearwardly from the following tooth toward the tooth next following.

5. The circular saw of claim 4, wherein said cutting portion comprises a tip secured to the blade of the saw of chisel configuration.

6. A method of cutting lumber using a circular saw, to produce a kerf in such lumber, a chip-size material from the wood cut in making the kerf, the method comprising advancing the lumber into the saw with the side-to-side dimension of said lumber which the kerf is to extend across being a fraction of the radius of the saw, with rotation of the saw moving successive teeth on the saw through the lumber with a tooth moving into and across and then beyond said side-to-side dimension before the next following tooth on the saw partakes of such movement, the tooth being positioned to have a negative angle on the saw and being effective to chisel wood cut in making the kerf, and presenting a noncutting edge in the saw in advance of each tooth through its entire travel through the lumber which concavely curves from the cutting portion of the tooth and thence extends without convexity to beyond the lumber being cut.

* * * * *